Aug. 28, 1923.
J. E. CAPS
1,465,968
LIQUID PURIFIER
Filed April 30, 1920
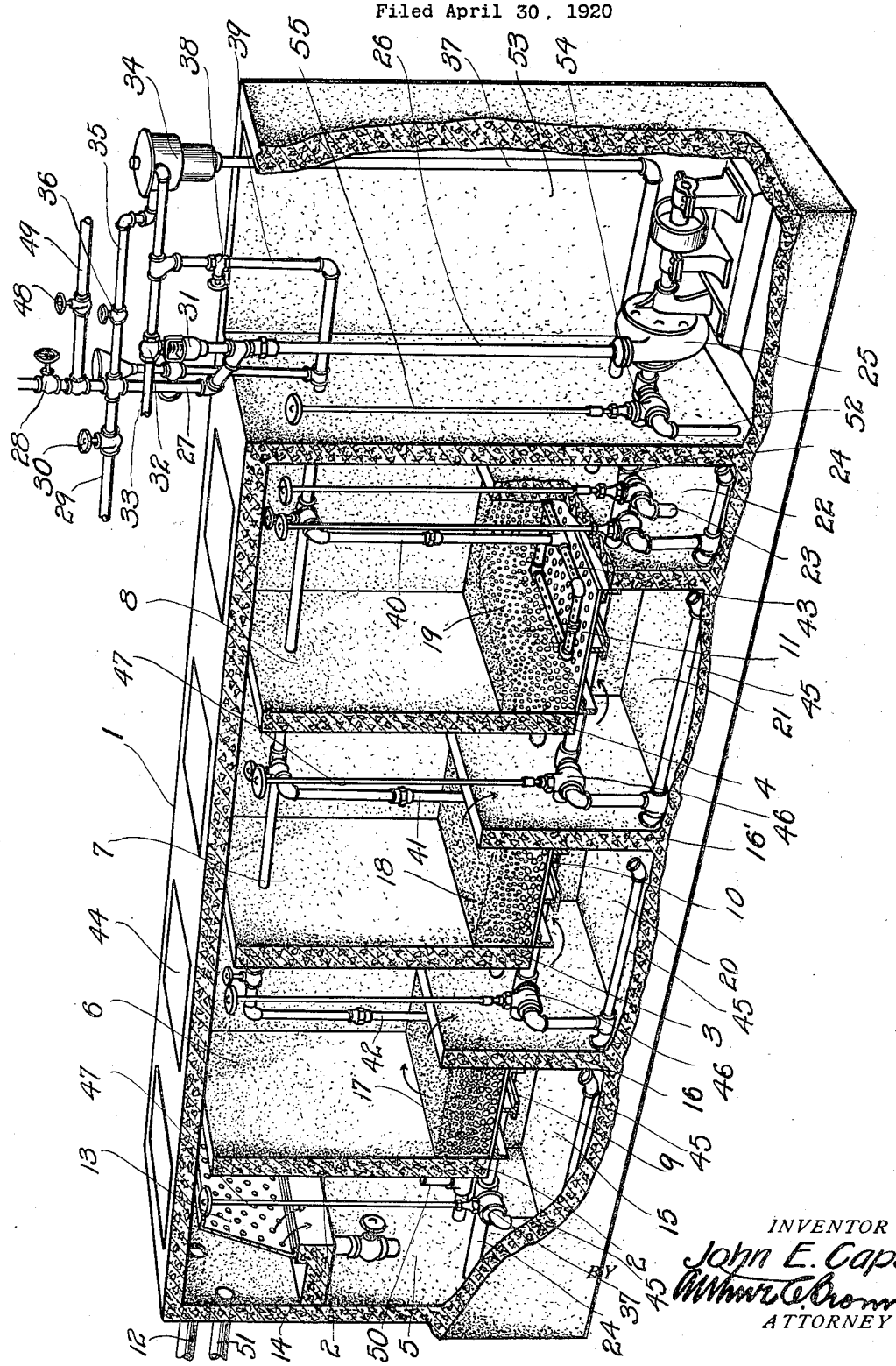
INVENTOR
John E. Caps.
BY
ATTORNEY Patented Aug. 28, 1923.

1,465,968

UNITED STATES PATENT OFFICE.

JOHN E. CAPS, OF WILMETTE, ILLINOIS.

LIQUID PURIFIER.

Application filed April 30, 1920. Serial No. 377,782.

*To all whom it may concern:*

Be it known that I, JOHN E. CAPS, a citizen of the United States, residing at Wilmette, in the county of Cook and State of Illinois, have invented certain new and useful Improvements in Liquid Purifiers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the purification of liquids and the primary object thereof is to provide means whereby the insoluble materials contained in the liquid may be disassociated therefrom in an efficient manner.

The invention is particularly applicable for use in conserving the detergent content of the wash water in laundries. After the "suds" has been used a certain length of time, it holds a considerable amount of dirt in suspension and it is the purpose of my invention to remove this dirt so that the wash water or suds may be recovered to be re-introduced into the washers. Of course, it may be necessary to add more water or additional saponifying agent but a relatively large portion of the original suds may be recovered for subsequent use after it has passed through the washers.

In carrying out my invention I utilize filter beds, preferably in series, the filtering material in each succeeding filter bed being somewhat finer than the material in the preceding bed. The obvious advantage is that the coarser particles in the suds may be first removed and progressively smaller particles may be progressively removed by the following beds. This general arrangement is well known but in such devices it frequently happens that the suds become cooled during treatment so that the saponifying agent coagulates into a more or less plastic mass so that it is difficult to force it through the filter bed.

Among the important objects of my invention is the provision of means whereby the filter bed may be supplied with artificial heat and maintained hot enough to prevent the coagulation of the saponifying agent and thereby prevent the filtering bed from becoming clogged or choked. The heat is so distributed throughout the filter bed that the suds will be maintained hot enough to remain in a fluid state during its passage through the filter beds.

I have also provided means whereby the sumps below the filter bed may be cleaned; that is, means is provided whereby the coagulated sludge or precipitated extraneous matter may be carried off so that the device containing the filter beds may be cleaned.

I have heretofore and will hereinafter refer to the device as particularly designed for use in connection with laundries but I do not limit myself to that particular use since the arrangement is such that it may be found applicable for use in other connections where it is desired to filter water or liquids for any purpose.

The figure in the drawing is a perspective sectional view through a liquid treating apparatus constructed in accordance with my invention.

The apparatus is shown as consisting of a substantially rectangular casing 1, provided with a plurality of transverse partitions 2, 3 and 4 which divide the structure into compartments 5, 6, 7 and 8. The number of compartments, however, may be varied to suit the varying conditions.

The partitions 2, 3 and 4 extend from the perforate floors 9, 10 and 11, which constitute the bottom of the filter beds, to a point near the top of the structure, the upper edges being spaced from the top. The suds water enters the closed structure or casing 1 through a pipe 12 where it will be screened by the inclined screen 13 carried by the shelf 14 above the floor of the structure 1. The water will pass through the perforate screen into the sump 15 below the perforate bottom 9 of the first filter and, on account of the partition walls 16 and 16' extending from the bottom of the structure 1 to about the level of the filter beds 17, 18 and 19, will pass through the first filter bed 17, then over the partition 16 into the sump 20 below the perforate floor 10 of the filter 18, then through the filter bed 18 over the wall 16' into the sump 21 through the filter 19 and into the sump 22, from where it may be drawn off through the nozzle 23 connected to the pipe 24 in communication with the pump 25 driven by any suitable source (not shown).

The pump 25 discharges through a pipe 26 which is adapted to communicate with the washers from which the suds originally came through the medium of a pipe 27, in which is a hand operated valve 28. The pipe 26 also communicates through pipe 27 with a pipe 29 adapted to lead to a sewer or waste, and the pipe 29 is also provided with a valve 30. When the valve 30 is closed, the valve 28 will be open and vice versa.

At the top of pipe 26 is a thermostat 31, adapted to control a valve 32 in a steam pipe 33 which may communicate with boiler pressure or any suitable source of steam adapted to supply heat to a heater 34, with which the pipe 33 communicates. The pipe 27 communicates with the interior of the heater 34 through the medium of a branch pipe 35 and said pipe 35 is provided with a valve 36 so that the filtered water may be diverted back through the heater 34 to return pipe 37 to heat the water in chamber 5 if desired. This in case the water coming from pipe 12 has not sufficient temperature to maintain the saponifying or detergent agent in a fluid state enough to permit it to pass through the filters.

If by chance the filter beds become clogged or choked, it may be advisable to admit steam direct into the filter beds and to this end the valve 38 in pipe 39 connected to the steam pipe 33 between the thermostat 31 and heater 34 will be open, admitting steam through pipe 39 into the vertical pipes 40, 41 and 42 so that the steam may enter the manifolds or rectangular frames 43 in the filter beds and supply sufficient heat to the filter beds and to the coagulated detergent or saponifying material to permit its easy removal as the water passes through the filter beds.

The casing 1 will preferably be embedded in the ground and access to the various compartments may be had by the removable manholes 44 so that access to the valves for controlling the pipes complementary to the various compartments may be had.

The pipe 24 communicating with the intake nozzle 23 and in communication with the pump 25 preferably extends practically the entire length of the casing 1 and beneath the filter beds. Each intake pipe is provided with a valve 46, the valve stem 47 of which extends adjacent to the manifold so that the valves 46 may be readily controlled through the openings closed by the manholes 44. The intake pipes 45 which communicate with the pump 25 for the purpose of removing the sludge or extraneous matter from the various sumps are adapted to permit the withdrawal or removal of the objectionable matter through the pipe 24, through the pump 25 and through the pipes 26, 27 and 29. During this time the valves 28 and 36 will be closed. If it is desired to flush out the sumps, the valves 28, 30 and 36 will be closed and the valve 48 in pipe 49 will be open, it being understood that the pipe 49 is connected to a city water supply or some other convenient source of supply to permit fresh water to pass into the pipe 26 through pipe 27, through the pump and into the sumps.

If the parts are assembled as shown in the drawings and the valves 30, 28 and 48 are closed, the suds water will pass into the casing 1 through pipe 12, through the screen 13 and into the sump 15, through the filter bed 17 into sump 20, through filter bed 18 into sump 21, through the filter bed 19 into sump 22 through nozzle 23, into pump 25 out through pipe 26 and through pipe 27 back to the washers. If, however, the water is cool enough to cause actuation of the thermostat 31, the thermostat will open the valve 32, permitting steam to pass through pipe 33, through pipe 39 into pipes 40, 41 and 42 and through the manifolds or frames 43 to heat up the filter beds and, thereby prevent coagulation of the detergent or saponifying content of the suds. If the valve 36 is open, some of the water delivered to pipe 27 will pass into the heater to have its temperature raised by the steam delivered through pipe 33 and this water can be returned to the compartment 5 through the pipe 37 to preliminarily heat the suds before it passes into the first compartment 6 and thereby raise its temperature sufficiently high to eliminate probability of the saponifying agent choking or clogging the filter beds.

If it is desired to direct the suds to the waste or sewer, the valves 28, 48 and 36 will be closed and the valve 30 will be opened. If it is desired to admit water for flushing purposes, the valves 28, 30 and 36 will be closed and the valve 48 will be opened; in which event the water will pass from 49 to 27, through pipe 26, through pump 25, through pipe 24 and discharge into the sump through the nozzles or intake pipes 45, which, in this instance, will be delivery pipes. After the filter has been flushed, the pump can be operated to carry off the sludge or mud mixed with the water through the pump, through pipes 26 and 27 and through pipe 29 to the sewer.

The water directed through pipe 12 may be discharged through a nozzle 50 in chamber 5 and I have provided an overflow pipe 51 in chamber 5 so that in the event that the water in the apparatus rises too high, it may pass off through the discharge or exhaust pipe 51.

I have also provided a valve-controlled nozzle 52 in the compartment 53 at the end of the casing and in which the pump is located, and said pipe 52 may be controlled by a valve 54, having a valve stem 55 accessible from the top of the chamber or compartment 53 so that accumulated liquid below the pump base may be carried off in an obvious manner.

The thermostat 31 may be of any preferred construction adapted to operate the valve 32 and the heater 34 may be of a well known construction in which an outer casing surrounds the water pipe or coil so that the steam may be used for the heating medium for the water entering the heater preparatory to passing into the pipe 37.

It will be apparent from the foregoing that a device constructed in accordance with my invention will insure efficient performance under varying conditions and that liability of the filter beds becoming clogged or choked will be eliminated.

What I claim and desire to secure by Letters-Patent is:

1. In a device of the class described, a filter bed, means for delivering liquid to said filter bed, means for exhausting liquid from the filter bed, a steam pipe communicating with the filter bed but normally closed with respect thereto, and means responsive to variations in temperature of the liquid exhausted from the filter bed to open and close the steam pipe.

2. In a device of the class described, a casing comprising a plurality of communicating compartments, in some of which are located filter beds, a pump for exhausting liquid from one of the compartments, a discharge port for said pump, a steam pipe communicating with at least one of the filter beds, and a thermostatically controlled valve in the steam pipe and having movement in response to variations in the temperature of liquid passing through the discharge pipe for the pump.

3. In a device of the class described, a casing comprising a plurality of communicating compartments, in some of which are located filter beds, a pump for exhausting liquid from one of the compartments, a discharge port for said pump, a steam pipe communicating with at least one of the filter beds, a thermostatically controlled valve in the steam pipe and having movement in response to variations in the temperature of liquid passing through the discharge pipe for the pump, a heater communicating with the compartments, the outer casing of the heater having a steam chamber communicating with the steam pipe, and means for directing liquid from the discharge pipe of the pump into the heater to direct it back to the compartments of the casing.

4. In a device of the class described, a casing having a plurality of compartments, filter beds in some of said compartments, a pump having an inlet in communication with the casing to exhaust liquid therefrom, a heater, means for directing liquid from said pump through the heater, and means for supplying heat to said heater in response to variations in temperature of the liquid discharging from said pump.

In testimony whereof I affix my signature.

JOHN E. CAPS.